US006964092B1

(12) United States Patent
Lorenz et al.

(10) Patent No.: US 6,964,092 B1
(45) Date of Patent: Nov. 15, 2005

(54) CUTTING EDGE CART

(75) Inventors: Donald E. Lorenz, Langdon, ND (US); Donald W. Quam, Langdon, ND (US)

(73) Assignee: Blade Lift, Inc., Fargo, ND (US)

( * ) Notice: Subject to any disclaimer, the term of this patent is extended or adjusted under 35 U.S.C. 154(b) by 130 days.

(21) Appl. No.: 10/304,530

(22) Filed: Nov. 26, 2002

(51) Int. Cl.[7] .............................................. B23Q 15/00
(52) U.S. Cl. ..................... 29/721; 29/270; 29/281.1; 29/267; 269/17; 269/5; 269/5 R; 269/16
(58) Field of Search ............................ 29/281.1, 281.6, 29/824, 270, 267, 700; 269/17, 5, 5 R, 16, 269/906, 55, 79

(56) References Cited

U.S. PATENT DOCUMENTS

| | | | | |
|---|---|---|---|---|
| 3,941,400 A | * | 3/1976 | Buttner | 280/79.11 |
| 4,830,335 A | * | 5/1989 | Schlitt | 254/7 B |
| 6,241,227 B1 | * | 6/2001 | Berdan et al. | 269/17 |
| 6,533,260 B1 | * | 3/2003 | Mock | 269/17 |

OTHER PUBLICATIONS

"The Center Line" North Dakota Transportation Technology Transfer Center, North Dakota State University, vol. 18, No. 1, Fall 2001, pp. 1-12.

* cited by examiner

*Primary Examiner*—David P. Bryant
*Assistant Examiner*—Stephen Kenny
(74) *Attorney, Agent, or Firm*—Marsh Fischmann & Breyfogle LLP

(57) ABSTRACT

A cutting edge cart is disclosed that provides an improved means for replacing the replaceable cutting edges on bladed equipment such as road graders and snow plow. The cart allows a single user to retrieve, transport, and position a replacement cutting edge relative to a mold board of the bladed equipment. Generally, the cart contains a frame, two or more transport assemblies attached to the frame, such as wheels, a movable carrier assembly that contains a cutting edge support assembly, and an adjuster. The adjuster is operable to move the carrier assembly between first and second positions relative to the frame allowing the vertical position of a supported cutting edge to be adjusted. The frame and transport assemblies are disposed such that the cart may be rotated or pivoted from a first generally vertical position to a second generally horizontal position. In this horizontal position, a cutting edge may be received within the cutting edge support and the cart rotated back to the generally vertical position.

51 Claims, 5 Drawing Sheets

US 6,964,092 B1

CUTTING EDGE CART

FIELD OF THE INVENTION

The present invention relates generally to bladed devices such as snow plows and earth working machinery. More particularly, the present invention relates to a blade or cutting edge handling cart for replacing blades/cutting edges that are typically releaseably affixed to bladed devices.

BACKGROUND

Earth working and snow removal equipment generally utilize a blade that is contacted with the ground to scrape away or "grade" a desired surface. Generally, the blade can be defined as having two main parts; a long support member, also referred to as a mold board, and a replaceable cutting edge interconnected to and extending downwardly from the lower edge of the support member. The mold board is generally made of steel and is typically concave on its forward side and may be adjustable about a vertical and/or horizontal axis for directing earth/snow removed from a surface. The cutting edge is generally bolted to the lower surface of the mold board and projects downward beneath the bottommost surface of the mold board. In this regard, when the blade is used for plowing/grading, the cutting edge contacts the ground and withstands most of the impact and abrasive wear to which the blade is subjected during use. Though made from durable steel, these cutting edges wear with usage. Upon reaching a predetermined amount of wear, these cutting edges must be replaced to prevent the bottom edge of the mold board from contacting the ground during use, thus causing permanent wear/damage to the permanent structure of the mold board.

Earth and/or snow moving equipment, and particularly earth and/or snow moving equipment utilized to grade/plow roads (i.e. a "road grader" or "patrol") are especially susceptible to heavy wear of their cutting edges, as they are often used to move highly abrasive materials such as gravel and asphalt. In this regard, the cutting edges of these machines must be frequently changed to prevent permanent structural damage from occurring. As a result, operations that utilize this type of equipment, such as road construction firms and governmental entities that are responsible for maintaining existing roads, spend a considerable amount of time replacing these cutting edges. The replacement of blade edges is generally time consuming and represents down time for the equipment. Further, on larger earth moving equipment, the blade may be up to about 24 feet in length and contain two or more sections of replaceable cutting edges. Even though these cutting edges may be separated into several sections, they may still be up to about 12 feet long and, as a metal plate, be quite heavy and awkward to handle. Often, two or more workers are required to hold the replacement cutting edges relative to the mold board for attachment thereto.

SUMMARY OF THE INVENTION

Accordingly, it is an objective of the present invention to provide an apparatus to selectively position a cutting edge relative to the mold board of bladed equipment for attachment thereto or removal therefrom.

A further objective is to provide an apparatus that allows a single worker to handle a replacement cutting edge and install/remove the cutting edge to/from a mold board of bladed equipment.

A yet further objective is to provide an apparatus with a reduced part count that is easily manufactured and easily stored when not in use.

These and additional advantages are indeed realized by the present invention in which a cutting edge cart for use in the application or removal of cutting edges to the mold board of bladed equipment is provided.

A blade or cutting edge cart of a first aspect of the present invention includes: a frame; at least one transport member interconnected with the frame to allow the frame to move along a support surface (e.g., to move the cart along the floor of a shop); a carrier assembly that is slidably attached to or interconnected with the frame and that includes an appropriately configured cutting edge support assembly; and an adjuster for selectively moving the carrier assembly relative to the frame. As will be appreciated, movement of the carrier assembly relative to the frame allows a cutting edge being held by the cutting edge support assembly to be raised or lowered to a desired vertical position or elevation relative to the support surface. More particularly, the slidable attachment of the carrier assembly to the frame allows a supported cutting edge to be raised to a vertical position in a near linear fashion and thereby facilitate positioning of the cutting edge relative to the mold board of a road grader or other bladed equipment. That is, the cutting edge may be positioned proximate the mold board and raised to a desired height (e.g., to the height of the mold board). However, this positioning feature may be used for any purpose, such as for removing a cutting edge from a mold board as well.

Various refinements exist of the features noted in relation to the subject first aspect of the present invention. Further features may also be incorporated in the subject first aspect of the present invention as well. These refinements and additional features may exist individually or in any combination. For instance, the frame may be made of any material that imparts the required mechanical properties, such as but not limited to, metals, aluminums, and composite materials. However, from manufacturing and durability standpoints, metals may prove a better choice.

In one embodiment of the first aspect, each of the cart's transport members are disposed at least generally under the cutting edge when held in the cutting edge support assembly and when the frame is disposed in an upright position that is perpendicular to the support surface. However, one or more of the transport members may be directly under the cutting edge when the cart is in this upright position, although preferably each transport member is offset by no more than about 2 inches from this "directly under" position (e.g., no more than about 2 inches of offset from a reference plane that extends along the length dimension of the cutting edge, that extends through the center of mass of the cutting edge, and that is perpendicular to the support surface, and which is measured perpendicularly to the reference plane). In another embodiment, each of the transport members will be mounted at least generally along a common axis and/or engage the support surface along a common axis that may, for example be disposed in at least generally parallel relationship with the cutting edge reference axis (i.e., the length dimension of the cutting edge). Where at least one transport member, and more preferably where each transport member, engages the support surface may define an axis about which the frame may be pivoted between a first generally upright position (e.g., with the frame disposed at a desired angle relative to the support surface) to a second generally horizontal or prone position to facilitate loading/unloading of a cutting edge into the cutting edge support assembly, as will be further discussed herein. As will be appreciated, this pivotal or rotational motion may generally be about an axis that is substantially parallel with the reference axis defined by the length of the cutting edge, especially when multiple transport members are mounted along a common axis that is substantially parallel to the reference axis corresponding with the length dimension of the cutting edge.

As noted, the transport member(s) utilized by the first aspect allow the cart to be moved over a support surface. Any appropriate type of transport member may be utilized, including wheels, rollers, casters, and the like. A single transport member could be utilized (e.g., in the form of a sufficiently long roller). Multiple transport members may also be utilized, preferably spaced along a length dimension of the cutting edge when loaded on the cart. Each transport member may be sized to permit the cart to easily move over the support surface on which the cart is intended to be used. In this regard, the support surface may be a hard smooth surface such as concrete, or, alternatively the support surface may be an uneven earthen surface. In this case, larger wheels may be utilized for a cart intended to be used in the "field" where rough uneven surfaces are expected. Preferably, the transport member(s) utilized by the first aspect will permit the cart to move in any direction. That is, the transport member(s) may be mounted such that they are able to rotate 360° and thereby allow the cart to move in any direction over the support surface.

The cart of the first aspect may further include a handle for manipulating the frame in a desired manner. In this regard, the handle will be at least interconnectable with the frame and may be selectively detachable from the frame when not in use. That is, the handle may be permanently attached to the frame, although the same is more preferably detachably interconnected with the frame. In one embodiment where the cart utilizes a handle, the cart's frame may be characterized as being at least generally disposed within a common reference plane or as a flat structure, with the handle being at least interconnectable to the frame so as to be at least substantially perpendicular to this reference plane. Another way to characterize the handle is that it is disposed in an at least generally horizontal position when the frame is disposed in an upright position that is perpendicular to the support surface.

The frame utilized by the first aspect may include, for example, a polygonal (i.e., rectangular) structure having upper and lower beams interconnected near the top and bottom ends of first and second side beams. When the frame is in an upright vertical position (e.g., with the first and second side beams being vertically disposed), the above-noted reference plane may be substantially perpendicular to the support surface. In this embodiment, each transport member may be interconnected to the lower beam and the carrier assembly may be slidably attached to the first and second side beams. Further, in this embodiment, the above-noted handle may act as a way to pivot or rotate the frame from a first generally upright position to a second generally horizontal or prone position. In this regard, the handle may act as a lever to pivot or rotate the frame about an axis or pivot (e.g., where at least one, and more preferably where each transport member engages the support surface). Accordingly, the handle may be attached to a lower portion of the frame (e.g., the lower beam) so that it is near the support surface, for example, attached no more than about five or six inches above the support surface, when the frame is in the upright position and perpendicular to the support surface. As will be appreciated, this allows the handle to be near the pivot axis of the cart and therefore provide additional leverage to pivot or rotate the frame between the first and second positions.

The carrier assembly utilized by the first aspect is slidably interconnected with the frame. The carrier assembly may be in the form of a single beam that slidably interfaces with laterally spaced portions of the frame (e.g., with a pair of laterally spaced beams). Alternatively, the carrier assembly could be in the form of multiple structures that are each slidably engaged with the frame at laterally spaced locations.

The cutting edge support assembly is utilized by the first aspect to receive and hold the generally plate-like cutting edge relative to the frame. The cutting edge support assembly may use one or more cutting edge supports. In this regard, any configuration for a cutting edge support may be utilized that is operable to receive and hold the cutting edge in a desired manner. For example, a single cutting edge support associated with the carrier assembly may be utilized so long as it will adequately support the cutting edge. Alternatively, two or more cutting edge supports may be utilized to support the cutting edge at two or more locations along the longitudinal extent or length dimension of the cutting edge. For example, two or more U-shaped members may be interconnected along the carrier assembly to support the cutting edge at multiple, spaced locations. Preferably, when two or more cutting edge supports are utilized, they may have a spacing that is maximized relative to the carrier assembly and/or the frame to provide the widest possible support along the length dimension of the cutting edge and thereby provide added stability. Preferably, the cutting edge support(s) are disposed relative to the frame such that the cart may be disposed in an upright position unassisted when loaded with a cutting edge. That is, the cart may be able to "sit" on its transport member(s) and the end of the handle (i.e., like a tripod when two transport members are used). Further, to facilitate cutting edge attachment/removal to a mold board, the cutting edge support(s) may hold the cutting edge in an upright position along its longitudinal axis when the frame is in the upright position. In this regard, any adequately shaped cutting edge support may be used.

The above-noted cutting edge supports may be disposed on a front surface of the frame. This embodiment allows the cutting edge supports to be between the frame and support surface when the frame is pivoted or rotated to an at least generally horizontal or prone position relative to the support surface for loading of a cutting edge. In this regard, a cutting edge sitting on the support surface (or more typically slightly spaced therefrom, such as by disposing the cutting edge on a plurality of blocks spaced along the length of the cutting edge) may be loaded into the cutting edge supports while they are disposed relative to the support surface (e.g., a plate like cutting edge may be directed into one or more U-shaped cutting edge supports) after which the frame may be pivoted or rotated into a desired upright position.

In order to move a supported cutting edge to a desired vertical position relative to the support surface in accordance with the first aspect, the cart's adjuster may interconnect the frame and the carrier assembly. Any adjuster that interconnects the frame with the carrier assembly in a manner that allows the position of the carrier assembly to be selectively moved (i.e., slid) relative to the frame may be utilized. In this regard, the adjuster may be embodied in a jack type adjuster (e.g., mechanical or hydraulic/pneumatic) having a first end interconnected to one of the structures (i.e., frame and carrier assembly) and having a second end interconnected to the other structure. Alternatively, the adjuster may be embodied in the form of a winch type adjuster operative to selectively move the carrier assembly relative to the frame. In this regard, the winch type adjuster may contain a crank mounted to, for example, the frame and having at least one cable interconnected to the carrier assembly such that when the crank is turned, the cable is wound or unwound. This winding and unwinding of the cable will move the carrier assembly in first and second directions. As will be appreciated, utilization of a winch type adjuster may further require the use of pulleys to route the cables between the frame and carrier assembly. Regardless of the type adjuster utilized, the adjuster will preferably contain a locking mechanism that allows the carrier assembly to be secured in a selected position relative to the frame. As will be appreciated, this allows a cutting edge to be secured in a desired vertical position relative to the support surface for attachment/detachment to a mold board.

According to a second aspect of the present invention, a blade cart is provided that includes: a frame; at least one transport member interconnected with the frame and that is at least engageable with a support surface; a carrier assembly movably interconnected with the frame and that has a cutting edge support assembly; and an adjuster interconnected to each of the frame and carrier assembly for moving the carrier assembly relative to the frame to dispose the cutting edge at a desired vertical position relative to the support surface. Each transport member is disposable at least generally along a common axis on the support surface. This may be used to define an axis about which the entire cart may be pivoted to position the frame for loading a cutting edge thereon, and to then position the frame in a desired orientation relative to the support surface to move the cart along the support surface.

Various refinements exist of the features noted in relation to the subject second aspect of the present invention. Further features may also be incorporated in the subject second aspect of the present invention as well. These refinements and additional features may exist individually or in any combination. For example, as above in the first aspect, the transport members may be in the form of wheels, rollers, casters, and the like, and may be sized to permit the cart to easily move over the support surface on which the cart is intended to be used. Whatever type of transport member is utilized, each transport member may be mounted along a common axis that is at least substantially parallel to the reference axis along which the cutting edge extends when loaded on the cart (e.g., the length dimension of the cutting edge).

As noted, the carrier assembly of the subject second aspect is operable to move relative to the frame to dispose a cutting edge at a desired height relative to the support surface. In this regard, the carrier assembly is movable relative to the frame. Any interconnection that allows the carrier assembly to move from a first position to a second position relative to the frame while lifting/lowering the cutting edge to a desired vertical position relative to the support surface is acceptable. For example, a first end of the carrier assembly may be mounted to the frame such that a second end is able to pivot about the first end, allowing the second end, which may contain the cutting edge support assembly, to be adjusted along an arcuate path. Alternatively, the carrier assembly may be slidably attached to the frame and move relative to the frame in a linear fashion.

In one embodiment of the subject second aspect, the carrier assembly contains a cutting edge support assembly that holds a cutting edge relative to a front surface of the frame when the frame is in a generally upright position. In this embodiment, this front surface of the frame is the surface of the frame that will face the support surface when the frame is pivoted or rotated into an at least generally horizontal or prone position. In this regard, the cutting edge support assembly may be disposed between the frame and the support surface when the frame is in the second position to allow a cutting edge disposed on the support surface to be loaded therein. For example, if the cutting edge support assembly includes multiple cutting edge supports that are in the form of at least generally U-shaped members, the plate-like cutting edge or the frame may be moved at least generally parallel with the support surface to engage or seat the cutting edge within the cutting edge supports.

Once a cutting edge is loaded in the case of the second aspect, the frame may be pivoted or rotated back to a desired upright position relative to the support surface using, for example, a handle that is at least interconnectable to a back surface or side of the frame. Further, once in the desired upright position relative to the support surface, the cart may be moved to a desired position whereupon the adjuster, which may be of any appropriate configuration (i.e. jack type, winch type etc.), may be utilized to move the cutting edge to a desired height relative to the support surface (or more accurately, a mold board that is to receive the cutting edge).

According to a third aspect of the present invention, a method is provided for utilizing a blade or cutting edge cart for replacing a cutting edge on a mold board. The method includes the steps of first rotating or pivoting the cart from an upright position to what may be characterized as a face-down or at least generally prone position. In this "face-down" position, a front surface of the cart may at least generally project toward a support surface, the frame may be disposed in at least generally parallel relation with the support surface, or both. In any case, an at least generally horizontally oriented plate-like cutting edge may then be directed into a movable carrier assembly disposed on the front surface of the cart. Next, the cart is rotated or pivoted from the face-down position back to an upright position so that the cutting edge is now supported in an upright position on the front surface of the cart. Once in an upright position, the cart and the supported cutting edge may be positioned relative to the mold board and the cutting edge may then be attached thereto.

Various refinements exist of the features noted in relation to the subject third aspect of the present invention. Further features may also be incorporated in the subject third aspect of the present invention as well. These refinements and additional features may exist individually or in any combination. The first and second pivoting or rotating the steps of the subject method may generally entail raising and lowering, respectively, a handle that is interconnected to a back surface of the cart. For example, by raising the nonattached, distal end of the handle or moving the same at least generally away from the support surface, the cart may be pivoted or rotated into the above-noted face-down position. Further, this handle may be utilized for directing the cutting edge into the cutting edge supports. That is, while the cart is in the face-down position, the handle may be utilized to direct the frame, carrier assembly and its cutting edge supports (e.g., U-shaped supports) onto a cutting edge that is supported a predetermined distance above the support surface (e.g., ground). The cart may then be pivoted or rotated to the desired upright position by lowering the handle or moving the same at least generally toward the support surface. The cart and supported cutting edge can then be moved along the support surface and relative to the mold board (i.e., pushed or pulled to a desired location over a support surface). Finally, an adjuster may be utilized to move the cutting edge to a desired height relative to the mold board. As will be appreciated, this provides a method for retrieving, transporting, and lifting a cutting edge without having to manually handle that cutting edge.

According to a fourth aspect of the present invention, a method for handling a cutting edge is provided. The method includes the steps of: disposing a cutting edge cart in an at least generally horizontal or prone first position; loading a cutting edge onto the generally horizontal or prone cutting edge cart; and moving an upper portion of the cutting edge cart at least generally away from a supporting surface on which the cart is resting and at least generally about a lower portion of the cutting edge cart to a second position.

Various refinements exist of the features noted in relation to the subject fourth aspect of the present invention. Further features may also be incorporated in the subject fourth aspect of the present invention as well. These refinements and additional features may exist individually or in any combination. The disposing step of the subject fourth aspect of the present invention may generally include pivoting an upper portion of the cart toward the support surface and about a lower portion of the cart. That is, the cart may be pivoted to allow a previously vertically disposed or at least generally upright portion of the cart to be disposed in an at least generally horizontal or prone position relative to the support surface. Once in the generally horizontal or prone position, the cutting edge may be loaded into the cart by either moving the cutting edge or the horizontally disposed cart in at least generally parallel relationship to the support surface. That is, either the cutting edge or cart may be slid along the support surface to load the cutting edge into cutting edge supports that may be associated with the cart. As will be appreciated, to load the cutting edge into cutting edge supports of the cart, the cutting edge may have to be disposed in a spaced relationship to the support surface (i.e., lifted/supported above the support surface) to allow the cutting edge supports to slide beneath the cutting edge.

Once the cutting edge cart is loaded in the case of the fourth aspect, the moving step may further include pivoting the upper portion of the cart at least generally away from the support surface and about the lower portion of the cart. That is, the cart may be pivoted to allow a previously horizontal portion of the cart to now be disposed in a vertical or upright position relative to the support surface. Furthermore, it will be noted that after this second pivoting, the cutting edge may be supported in the cutting edge cart in a generally upright position along its length. Once in the upright position, the cart may be supported on its transport member(s), allowing the cart and the supported cutting edge to be moved along the supporting surface. That is, the cutting edge may be positioned relative to a mold board on a road grader and then adjusted to a desired vertical position. Upon being properly aligned, the cutting edge may be installed (i.e., bolted) onto the mold board of a road grader.

A fifth aspect of the present invention provides a method for handling a cutting edge during removal of a cutting edge from a road grader. The method comprises the steps of: disposing the cutting edge support assembly of a cutting edge cart under a cutting edge that is installed on the mold board of a road grader or the like; adjusting the vertical position of the cutting edge support assembly such that at least a portion of the cutting edge is disposed within the support assembly; detaching the cutting edge from the mold board; and moving an upper portion of the cutting edge cart towards the support surface about a lowered portion of the cutting edge cart. This moving step allows the detached cutting edge to be lowered to the support surface.

The method of the subject fifth aspect of the present invention may further comprise additional steps that may exist individually or in any combination. For example, prior to the moving step, the vertical position of the cutting edge support and detached cutting edge may be adjusted to a second (e.g., lower) position. This may entail sliding the cutting edge carrier assembly from a first position to a second position relative to the frame. Furthermore, prior to the moving step, the cutting edge cart may be moved over the support surface to transport the detached cutting edge to a desired location.

A sixth aspect of the present invention is embodied by a blade or cutting edge cart for handling a cutting edge that is detachably interconnectable with a mold board of a road grader or the like. The entire cutting edge cart may be at least generally pivoted between at least two different positions to load and unload a cutting edge therefrom.

Various refinements exist of the features noted in relation to the subject sixth aspect of the present invention. Further features may also be incorporated in the subject sixth aspect of the present invention as well. These refinements and additional features may exist individually or in any combination. The axis about which the cutting edge cart may be at least generally pivoted may be defined by where one or more transport members of the cart engage a support surface on which the cart is disposed. In any case, the cutting edge cart associated with the sixth aspect may be pivoted into what may be characterized as an at least generally upright position (e.g., at any desired angle relative to the support surface on which the cart may be traversed). This upright position may be used to support a cutting edge on the cart in vertically spaced relation to an appropriate support surface (e.g., a shop floor). Such a cutting edge may be installed on a mold board by disposing the cart in a desired position relative to the mold board and moving a cutting edge carrier of the cart relative to a frame of the cart (e.g., moving the cutting edge at least substantially within a reference plane to the desired vertical position). This upright position may also be utilized to support a cutting edge while the same is being removed from a mold board.

The entire cutting edge cart associated with the sixth aspect also may be pivoted to what may be characterized as a prone position. This prone position may be utilized to both unload a cutting edge from the cart and to load a cutting edge onto the cart. Once pivoted into the prone position so as to dispose the cutting edge in relatively close proximity to an appropriate support surface, a previously loaded cutting edge may be manually removed from the cart. Moreover, a cutting edge that is maintained in spaced relation to the support surface may be loaded onto the cart by moving the cutting edge cart in at least generally parallel relation to the support surface when the cutting edge cart is in the noted prone position. Thereafter, the cutting edge cart may be pivoted at least toward the above-noted upright position to allow the cart to be moved along the support surface to the desired location.

It should be appreciated that each of the various features discussed above may be utilized by the subject sixth aspect as well, alone or in any combination.

DETAILED DESCRIPTION

In the following description, the cutting edge handling cart is set forth primarily in the context of replacing cutting edges bolted to the forward edge of a mold board on a road grader vehicle. However, the present invention is also applicable for replacing the cutting edges on a mold board of a snow plow-type device or any other bladed machinery.

Figure 1:
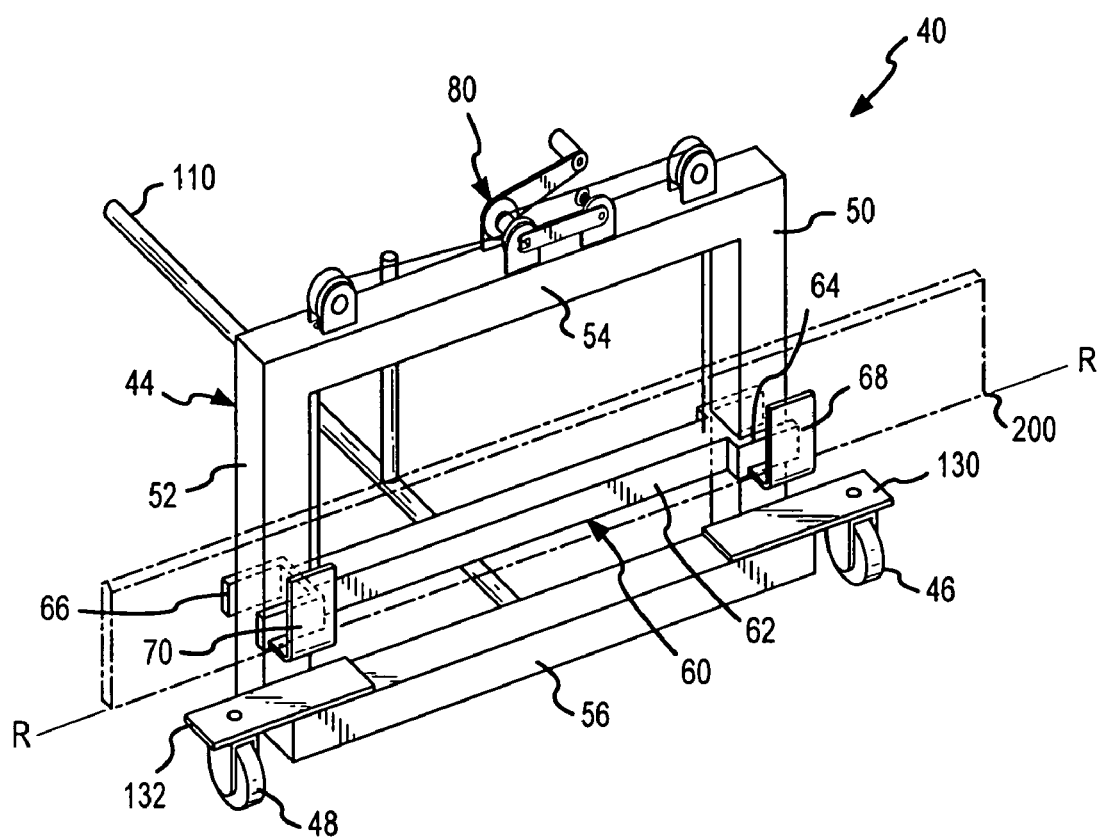
FIG. 1 shows a perspective view of one embodiment of a cutting edge handling cart.

FIG. 1 is a perspective view of one embodiment of a cutting edge handling cart 40 (hereinafter "cart"). The cart 40 may be utilized to retrieve and transport a cutting edge 200 (shown in phantom in FIG. 1) and position that cutting edge 200 relative to a mold board 210 on a road grader vehicle for attachment thereto (see FIG. 4), as well as to facilitate the removal of such a cutting edge 200 from a mold board 210. The cart 40 generally includes a frame 44, a carrier assembly 60 slidably mounted to the frame 40 so as to move at least generally within a reference plane, cutting edge carriers 68, 70, wheels 46, 48, an adjuster 80 for moving the carrier assembly 60 relative to the frame 44 within the noted reference plane, and a handle 110 for use by a mechanic or the like in handling the cart 40. In addition to positioning the cutting edge 200 relative to a mold board 210, the cart 40 allows a single mechanic to retrieve the cutting edge 200, transport the cutting edge 200, and position that cutting edge 200 relative to the mold board 210 without having to manually handle the cutting edge 200.

The frame 44 generally defines a rectangular polygonal structure having first and second side beams 50, 52 that are interconnected at their top ends by a top crossbeam 54 and that are interconnected at the front surface of their bottom ends by a bottom crossbeam 56. As shown, all the beams 50–56 are all formed of square metal tubing and are welded to one another. However, any suitable way for affixing the various beams 50–56 together may be utilized, such as, for example, bolting and/or riveting. Additionally, the beams 50–56 may be made out of any material having any cross-sectional profile so long as that material/cross-sectional profile exhibits the required strength and durability, such as aluminum, composite materials, etc. As shown in FIG. 1, the cart 40 holds the cutting edge 200 along a reference axis R—R that runs substantially parallel with the top and bottom crossbeams 54, 56.

The cart 40 contains two wheels 46, 48 that are mounted to the bottom crossbeam 56 using first and second extender plates 130 and 132, respectively. These extender plates 130, 132 are fixedly interconnected (e.g., welded) to the top surface of the bottom crossbeam 56 and extend outward. In this regard, the wheels 46, 48 are generally disposed along a common axis that is substantially parallel with the reference axis R—R. This allows the entire cart 40 to be more readily pivoted about the tangent of the wheels 46, 48 with the support surface for loading/unloading a cutting edge 200 onto/from the cart 40. The wheels 46, 48, as shown, are castor wheels which are operable to rotate 360° and thereby permit the cart 40 to move in any direction over a surface.

As shown in FIG. 1, the carrier assembly 60 of the cart 40 generally comprises a lateral member 62 that is slidably mounted between the first and second side beams 50, 52 of the frame 44. In this regard, each end of the lateral member 62 of the carrier assembly 60 is affixed (e.g., welded) to a square U-bracket 64, 66. These U-brackets 64, 66 are sized to matingly receive the square tubular side beams 50 and 52 of the frame 44. In this regard, the U-brackets 64, 66 are engaged over the side beams 50, 52 prior to one of the crossbeams 54, 56 being affixed to the frame 44. In this regard, the lateral member 62 of the carrier assembly 60 is permanently affixed between the first and second side beams 50 and 52, while still being able to move up and down from a first position to a second position in relation to the side beams 50, 52. Any way for slidably interconnecting the lateral member 62 with the frame 44 may be utilized that allows the lateral member 62 (and thereby a cutting edge 200 supported thereby) to move at least generally within a reference plane.

The carrier assembly 60 also contains first and second cutting edge supports 68, 70 for receiving and holding the cutting edge 200 relative to the frame 44. These cutting edge supports 68, 70 are fixedly attached to the lateral member 62 at first and second points along the length of the carrier assembly 60 and are operable to receive a cutting edge 200 and support that cutting edge 200 at first and second positions along its longitudinal axis (see FIGS. 1 and 4). In order to provide stability in supporting the cutting edge 200, which may be up to about 12 feet in length, the first and second cutting edge supports 68, 70 are affixed to the U-shaped brackets 64, 66 of the carrier assembly 60 in the illustrated embodiment. This spacing allows the cutting edge supports 68, 70 to have a maximum spacing relative to the frame 44. This spacing allows the cutting edge supports 68, 70 to support the cutting edge 200 at two substantially spaced points in relation to the cutting edge's overall length, thereby providing increased stability when supporting the cutting edge 200. The cutting edge supports 68, 70 can be attached to the remainder of the carrier assembly 60 in any other appropriate manner and at any other appropriate location. However, preferably the cutting edge supports 68, 70 are incorporated on the carrier assembly 60 so as to be sufficiently spaced to provide end-to-end stability for the cutting edge 200 when on the cart 40. In one embodiment, the cutting edge supports 68, 78 are spaced by a distance of about 28 inches.

Figure 4:
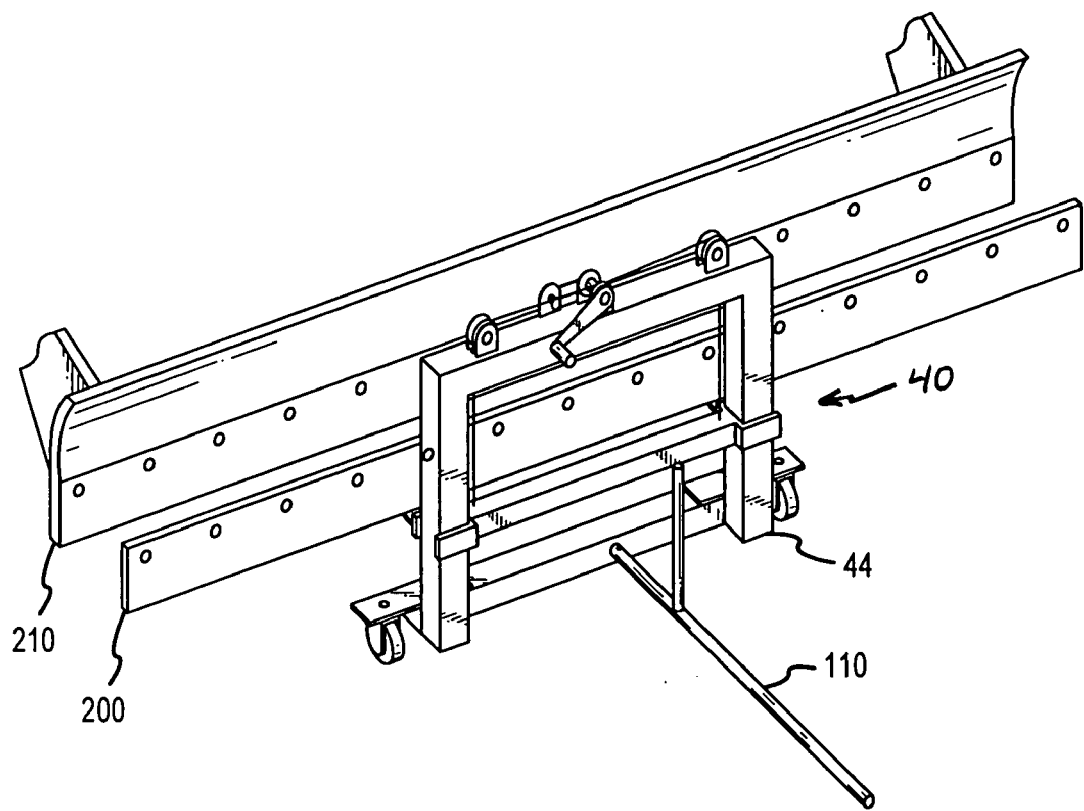
FIG. 4 shows the cart of FIG. 1 holding a cutting edge relative to a mold board for attachment thereto.

The cutting edge supports 68, 70 are also preferably sized to receive the plate-like cutting edge 200 and hold that cutting edge 200 in an upright position along the reference axis R—R when the cart 40 is in the upright position, as shown in FIGS. 1 and 4. Each cutting edge support 68, 70 contains an upright leg that extends along the width of the cutting edge 200 and traps the cutting edge 200 between that upright leg and the side beams 50, 52 of the frame. In this regard, the cutting edge supports 68, 70 generally comprise a U-shape that is sized to receive the cutting edge 200.

Figure 3:
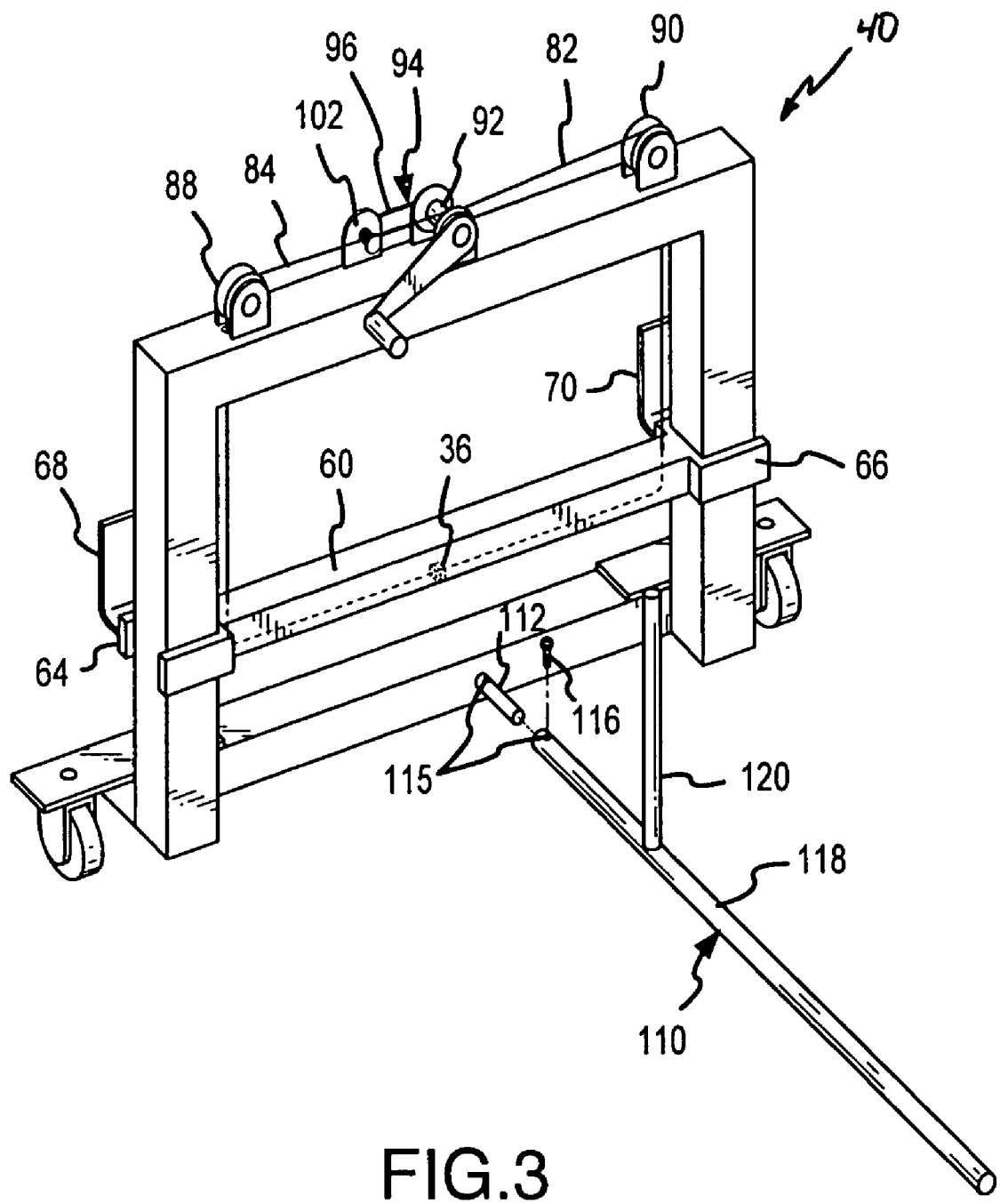
FIG. 3 is a rear perspective view of the cart of FIG. 1.

Referring to FIGS. 1 and 3, the adjuster 80, which is utilized to raise and lower the carrier assembly 60 relative to the frame 44 of the cart 40, will be described. In particular, the adjuster 80 is embodied as a winch 80 mounted to the top crossbeam 54 of the frame 44, which is interconnected to the carrier assembly 60 by first and second cables 82, 84. A first end of each cable 82, 84 is interconnected about the central axle 92 of the winch 80 such that, when the handle 86 of the winch 80 is turned, these cables 82 and 84 are either wound around or unwound from this central axle 92. Each cable 82, 84 is routed from the winch 80, through a set of apertures 22, 24 near the ends of top cross-beam 54 via first and second pulleys 88 and 90, respectively, and interconnected to the lateral member 62 of the carrier assembly 60 in any appropriate manner. The pulleys 88, 90 are mounted to the top crossbeam 54 such that each cable 82 and 84 is routed between the top crossbeam 54 and the lateral member 62 near the first and second side beams 50 and 52. As will be appreciated, this provides the widest possible attachment of the cables 82, 84 to the carrier assembly 60. This wide attachment helps prevent the carrier assembly 60 from binding (i.e., cocking) between the side beams 50, 52 when the carrier assembly 60 is drawn linearly up the side beams 50, 52 or within a reference plane.

The cables 82 and 84 may be interconnected to the lateral member 62 of the carrier assembly 62 in any appropriate fashion. However, the preferred embodiment is to route the cables 82, 84 through a second set of apertures 32, 34 on the lateral member 62 and interconnect the second ends of the cables 82, 84 together beneath the center of the lateral member 62, as shown in FIG. 3. In this regard, a cable attaching clevis 36 connects the ends of the two cables 82, 84. As will be appreciated, since the cables 82, 84 are not directly attached to the lateral member 62 of the carrier assembly 60, the cables 82, 84, in effect, form a single loop. As will be appreciated, this loop arrangement allows the cables 82, 84 to provide an equal lifting force to each end of the lateral member 62 as the winch 80 is turned. That is, the loop arrangement allows the cables 82, 84 to move relative to the lateral member 62 such that the tension in each cable 82, 84 is equalized and each end of the lateral member 62 is raised/lowered an equal amount by the winding/unwinding of the cables 82, 84. Other arrangements may be utilized to move the lateral member 62 relative to the frame 44 in effect within a reference plane.

Figure 2:
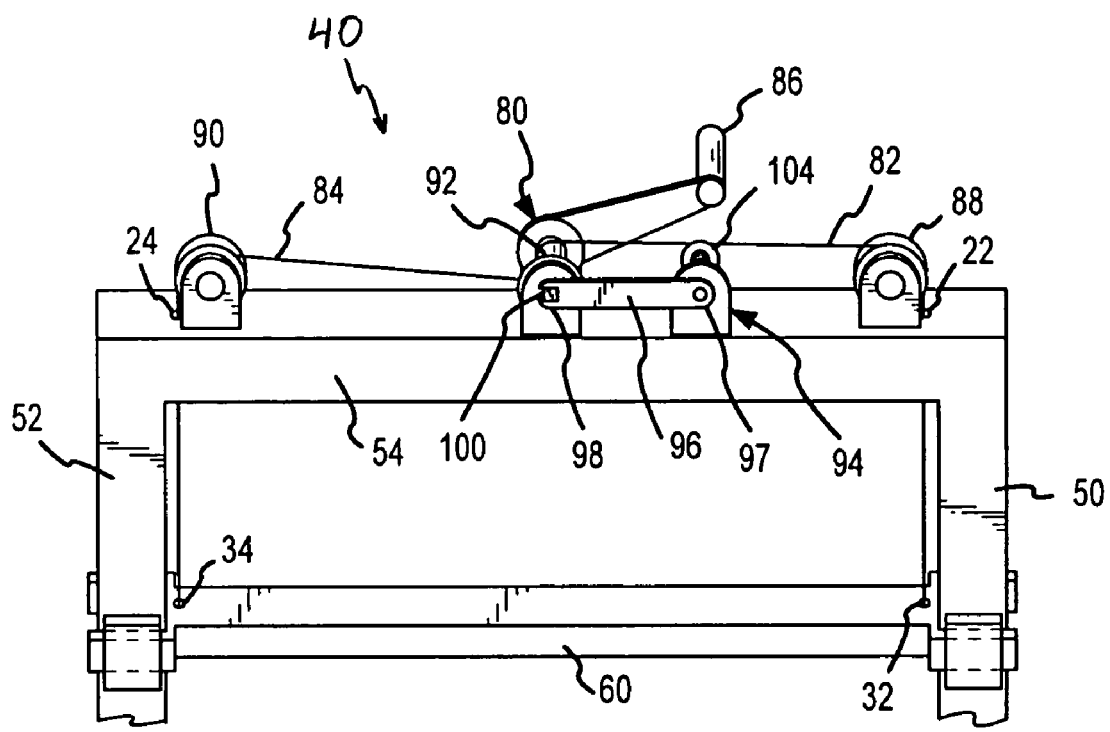
FIG. 2 shows the winch adjustor of the cutting edge handling cart of FIG. 1 that is utilized for raising and lowering the cutting edge relative to the handling cart.

The winch 80 also includes a lock assembly 94 for securing the winch 80 in a selected position. That is, once the carrier assembly 60 and a cutting edge 200 supported thereon is raised/lowered to a desired height, the winch 80 may be locked in position to prevent the carrier assembly 60 and cutting edge 200 from moving relative to the frame 44. As shown in FIGS. 2 and 3, the lock assembly 94 comprises an armature 96 and a mounting bracket 102 mounted to the top crossbeam 54 of the frame 44. A first end of this armature 96 contains a square socket 98 sized for selectively receiving a square lug 100 extending from the central axle 92 of the winch 80. When utilized, the square socket 98 of the armature 96 engages the square lug 100 extending from the axle 92 and thereby secures the carrier assembly 62 in a desired position. The armature 96 is pivotally mounted on its non-socket end 97 to allow the armature 96 to be moved away from the axle 92 and lug 100 when not in use. In this regard, the armature 96 is pivotally interconnected to the bracket 102 using a spring bolt assembly 104. This spring bolt assembly 104 applies pressure to the armature 96 that holds the armature 96 against the mount 102. When it is desired to lock the winch 80 in a desired position, pressure is applied to the spring bolt 104 to allow the armature 96 to rotate until the square socket 98 engages the square lug 100. Once engaged, the pressure is released from the spring bolt 104, which then retracts and holds the armature 96 against the mount 102, thereby restraining the winch's axle 92 from moving. Any appropriate type of locking mechanism may be utilized.

FIG. 3 shows how a handle 110 is attached to the cart 40. In particular, the handle 110 is interconnectable to the center of the lower crossbeam 56 and extends perpendicularly rearward therefrom. In this regard, the rear surface of the lower crossbeam 56 contains a circular lug 112 that is sized to be received within an end portion of the round tubular handle 110. Both the end of the handle 110 that interconnects to the frame 44, as well as the circular lug 112, contain a mating aperture 115 for receiving a retaining pin 116. In this regard, the handle 110 is selectively fastenable to the cart 40. This allows the handle 110 to be removed when the cart 40 is not being used and thereby allows the cart 40 to be easily stored. The handle 110 is generally T-shaped, having a first member 118 that attaches to the cart 40 and a second member 120 that extends perpendicularly away from the first member 118 in the illustrated embodiment. This second member 120 extends upward from the first member 118 in a direction that is at least substantially parallel with the first and second side beams 50, 52 when the handle 110 is interconnected to the cart 40.

The handle 110 is used to position the cart 40 relative to the mold board 210 for cutting edge attachment/removal or to otherwise manipulate the cart 40 in a desired manner, as well as to allow the cart 40 to be maintained in an upright position. In this regard, by picking up the unattached distal end of the first member 118 of the handle 110, the cart 40 will rest entirely on its wheels 46, 48 and may be pushed/pulled in a "wheelbarrow" fashion. The second member 120 of the handle 110 provides a convenient location for applying pushing and pulling forces to the cart 40 for one hand, while the other hand may be used to stabilize the cart 40 by grasping the first member 118. Additionally, and as will be more fully described herein, the handle 110 may be utilized to rotate or pivot the entire cart 40 from a generally vertical or upright position to a generally horizontal or prone position. That is, the handle 110 may be utilized to rotate or pivot the cart 40 such that the side beams 50, 52 are rotated/pivoted from a first position generally vertical in relation to a support surface, to a second position generally horizontal to the support surface (e.g., a prone position).

Figure 5A:
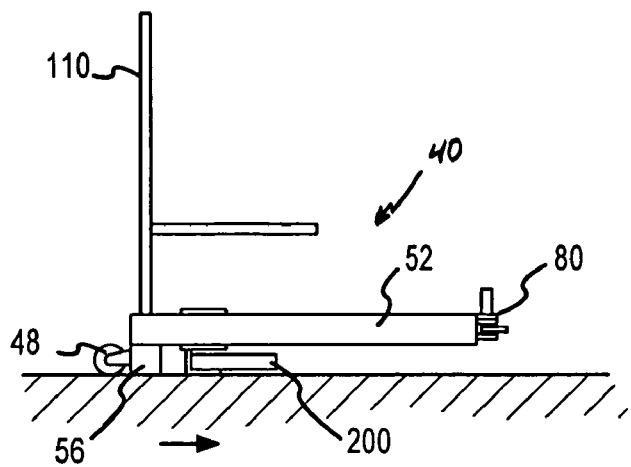
FIGS. 5a–5c show loading a cutting edge onto the cutting edge handling cart of FIG. 1.
Figure 5B:
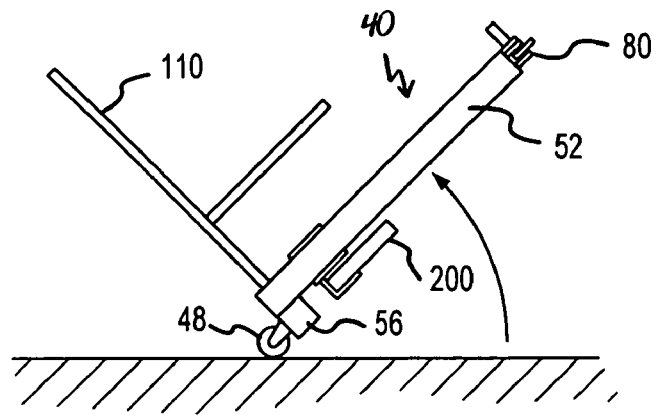
Figure 5C:
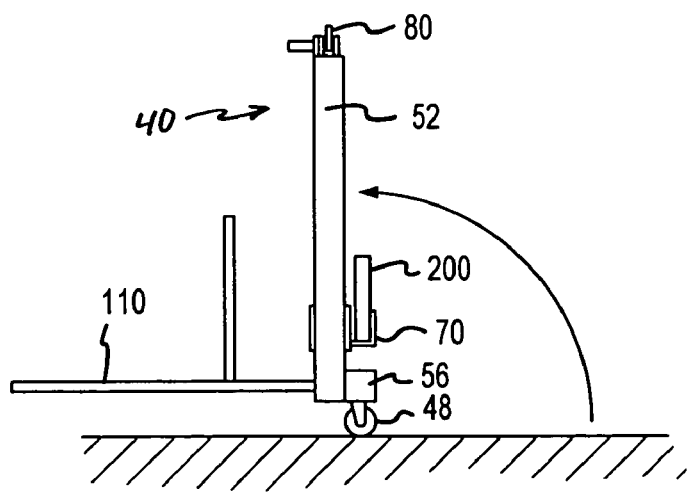

FIGS. 5a–5c show a side view of loading a cutting edge 200 into the U-shaped cutting edge supports 68, 70 of the carrier assembly 60. As will be appreciated, the heavy plate-like cutting edges 200 are generally stored on the ground/floor. From this position, a mechanic can, if needed, insert one or more small spacing blocks beneath the cutting edge 200 utilizing, for example, a crowbar to lift a portion of the cutting edge 200 slightly off the ground. The cart 40 is then positioned near the elevated cutting edge 200 and rotated or pivoted from the vertical or upright position to a horizontal or prone position by raising the handle 110 (i.e., moving its free end at least generally away from the support surface), until the front surface of the cart 40, which contains the U-shaped cutting edge supports 68, 70, is parallel with the ground. The entire cart 40 in effect pivots about an axis that is tangent to that portion of the wheels 46, 48 that interface with the support surface. In this position, the wheels 46, 48 of the cart 40 may no longer be supporting the cart 40 (see FIG. 5a). Instead, in this position the cart 40 may be sitting on/supported by the U-shaped cutting edge supports 68, 70, which may then be slid beneath the elevated cutting edge 200 as shown by the arrow in FIG. 5a. Once the cutting edge 200 is preferably fully seated within the U-shaped cutting edge supports 68, 70, a mechanic may lower the T-shaped handle 110 (i.e., move the free end of the handle 110 at least generally toward the support surface) to rotate or pivot the cart 40 back to the upright position at least generally about an axis that is tangent to the wheels 46, 48 where the same engage the support surface (see FIGS. 5b and 5c). That is, the cutting edge supports 68, 70 are configured so as to include a portion that is disposed between the cutting edge 200 and the support surface when the cart 40 is in the prone position such that they will exert an at least generally upwardly directed force on the cutting edge 200 as the cart 40 is pivoted into an upright position.

Once the cart 40 is in an at least generally upright position, it may be "wheeled" beneath a mold board 210 (see FIG. 4). The unattached distal or free end of the handle 110 may be set on the support surface allowing the cart 40 to lean back slightly such that it maintains its upright position unassisted. That is, the frame 44 may be disposed at an angle other than 90 degrees relative to the support surface when the free end of the handle 110 is engaged against the support surface. Once positioned, the winch 80 may be utilized to raise the carrier assembly 60 and supported cutting edge 200 to a desired vertical position relative to the mold board 210 (i.e., raised vertically off the ground) at which time the lock assembly 94 may be engaged with the square lug 100 of the winch 80 to affix the carrier assembly 60 and cutting edge 200 in position. This movement of the cutting edge 200 again is at least generally within, and more typically within, a reference plane. A mechanic may then affix (i.e., bolt) the cutting edge 200 to the mold board 210.

Though discussed above in reference to attaching a cutting edge 200 to a mold board 210, it will be appreciated that the cart 40 may also be utilized to remove a cutting edge 200 from a mold board 210 and transport the removed cutting edge 200 to a desired location for disposal (e.g., in the reverse order to that presented in FIGS. 5a–c). That is, the cart 40 may be positioned so that the carrier assembly 60 is under the cutting edge 200. The carrier assembly 60 may then be raised such that the cutting edge 200 will be supported by the cart 40 as the cutting edge 200 is detached from the mold board 210. That is, the free end of the handle 110 may be disposed on the support surface and the lateral member 62 is preferably disposed relative to the frame 44 so that the cutting edge supports 68, 70 are engaged or only slightly spaced from the lower extreme of the cutting edge 200. Whether installing or removing a cutting edge 200, the cart 40 allows a single mechanic to more effectively replace the cumbersome cutting edges 200 on a road grader.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain the best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A cutting edge cart, comprising:
   a frame;
   at least one transport member interconnected with said frame, wherein said at least one transport member allows said frame to move along a support surface;
   a carrier assembly slidably attached to said frame and comprising a cutting edge support assembly; and
   an adjuster operative to selectively move said carrier assembly relative to said frame to dispose a cutting edge being held by said cutting edge support assembly at a desired vertical position relative to the support surface, wherein said adjuster is mounted to said frame and interconnected to said carrier assembly to selectively move said carrier assembly relative to said frame, and wherein said adjuster comprises:
   a crank mounted to said frame; and
   at least one cable interconnecting said crank to said carrier assembly, said crank being operable to selectively wind said at least one cable and unwind said at least one cable, wherein said winding and unwinding moves said carrier assembly in first and second directions, respectively, relative to said frame.

2. The cart of claim 1, wherein each said transport member is disposed at least generally directly under the cutting edge when said frame is disposed perpendicular to the support surface.

3. The cart of claim 1, wherein each said transport member collectively defines a pivot axis about which said frame may pivot in order to load the cutting edge on said cutting edge support assembly for transport.

4. The cart of claim 1, wherein each said transport assembly is disposable on the support surface at least generally along a common reference axis.

5. The cart of claim 4, wherein said common reference axis is disposed at least generally parallel with a length dimension of the cutting edge when being held by said cutting edge support assembly of said carrier assembly.

6. The cart of claim 1, wherein:
   each said transport member is selected from the group consisting of wheels, rollers, and casters.

7. The cart of claim 1, wherein:
   said at least one transport member consists of the first and second transport members interconnected with said frame at spaced locations.

8. The cart of claim 1, further comprising:
   a handle at least interconnectable with said frame.

9. The cart of claim 8, wherein:
   said handle is detachably interconnectable with said frame.

10. The cart of claim 8, wherein when said handle is interconnected with said frame, said handle and said cutting edge support assembly are disposed on opposite sides of said frame.

11. The cart of claim 10, wherein when said frame is in an upright position and disposed at least generally perpendicular to the support surface, said handle is disposed within about five inches of the support surface.

12. The cart of claim 8, wherein said frame comprises upper and lower beams and first and second side beams that each extend between said upper and lower beams, wherein said handle is interconnectable with said lower beam, and wherein each said transport member is interconnected with said lower beam.

13. The cart of claim 12, wherein said upper beam engages an end of each of said first and second side beams, and wherein said lower beam engages a front face of each of said first and second side beams.

14. The cart of claim 8, wherein said handle comprises means for rotating said frame between at least first and second positions, wherein said frame is at least generally vertically disposed in said first position and is at least generally horizontally disposed in said second position.

15. The cart of claim 8, wherein said carrier assembly holds the cutting edge relative to said frame at a location that is spaced from a common axis along which each said transport member is mounted and in a direction in which said handle extends away from said frame.

16. The cart of claim 1, wherein said cutting edge support assembly comprises first and second spaced supports for receiving and supporting the cutting edge in at least first and second spaced positions along the cutting edge's longitudinal axis.

17. The cart of claim 16, wherein said first and second supports each comprise an at least generally U-shaped member fixedly interconnected to said carrier assembly.

18. The cart of claim 17, wherein each said U-shaped member holds the cutting edge in an upright position along its longitudinal axis when said frame is disposed in an at least generally vertically oriented position.

19. The cart of claim 1, wherein said adjuster further comprises at least one pulley mounted to at least one of said frame and said carrier assembly for routing said at least one cable between said carrier assembly and said crank.

20. The cart of claim 1, wherein said adjuster further comprises:
a lock for locking said adjuster, said lock allowing said carrier assembly to be secured in a selected position relative to said frame.

21. A cutting edge cart, comprising:
a frame;
at least one transport member interconnected with said frame and at least engageable with a support surface, wherein each said transport member is disposable at least generally along a common axis on the support surface;
a carrier assembly movably interconnected with said frame and comprising a cutting edge support assembly; and
an adjuster operative to selectively move said carrier assembly relative to said frame to dispose a cutting edge being held by said cutting edge support assembly at a desired vertical position relative to the support surface, wherein said adjuster further comprises:
a crank mounted to said frame; and
at least one cable interconnecting said crank to said carrier assembly, said crank being operable to selectively wind said at least one cable and unwind said at least one cable, wherein said winding and unwinding moves said carrier assembly in first and second directions, respectively, relative to said frame.

22. The cart of claim 21, wherein said cutting edge support assembly is fixedly interconnected to said carrier assembly and holds the cutting edge relative to a front surface of said frame when said frame is disposed in at least a generally vertically oriented position relative to the support surface.

23. The cart of claim 21, further comprising:
a handle at least interconnectable to said frame.

24. The cart of claim 23, wherein said handle comprises means for rotating said frame between at least first and second positions, wherein said frame is at least generally vertically disposed in said first position and is at least generally horizontally disposed in said second position.

25. The cart of claim 24, wherein said frame rotates about an axis at least substantially parallel with the reference axis defined by the cutting edge when held by said cutting edge support assembly.

26. The cart of claim 24, wherein said cutting edge support assembly is disposed between said frame and the support surface when said frame is in said second position.

27. The cart of claim 21, wherein said cutting edge support assembly comprises a U-shaped member fixedly attached to said carrier assembly.

28. The cart of claim 21, wherein said frame is an at least generally flat structure.

29. The cart of claim 21, wherein said carrier assembly is slidably attached to said frame.

30. The cart of claim 21, further comprising at least one pulley mounted to at least one of said frame and said carrier assembly for routing said at least one cable between said carrier assembly and said crank.

31. The cart of claim 21, wherein said adjuster further comprises:
a lock for locking said adjuster, said lock allowing said carrier assembly to be secured in a selected position relative to said frame.

32. A cutting edge cart, comprising:
a frame;
first and second transport members that are interconnected with said frame and that allow said cutting edge cart to move along a support surface, wherein said first and second transport members provide the sole contact between said cutting edge cart and a flat support surface when a first portion of said frame is disposed perpendicularly to the flat support surface; and
a carrier assembly movably interconnected with said first portion of said frame and comprising a cutting edge support assembly that is configured to support a cutting edge; and
an adjuster operative to selectively move said carrier assembly relative to said first portion of said frame to dispose a cutting edge being held by said cutting edge support assembly at a desired vertical position relative to the support surface.

33. The cart of claim 32, wherein said adjuster is mounted to said frame and interconnected to said carrier assembly to selectively move said carrier assembly relative to said first portion of said frame.

34. The cart of claim 32, wherein said first and second transport members are rotatable about a single, common rotational axis.

35. The cart of claim 32, further comprising:
a handle at least interconnectable with said frame.

36. The cart of claim 35, wherein:
said handle is detachably interconnectable with said frame.

37. The cart of claim 35, wherein said frame comprises upper and lower beams and first and second side beams that each extend between said upper and lower beams, wherein said handle is interconnectable with said lower beam, and wherein said first and second transport members are each interconnected with said lower beam.

38. A cutting edge cart, comprising:
a frame;
at least one transport member that is interconnected with said frame and that allows said cutting edge cart to move along a support surface, wherein contact between said cutting edge cart and a flat support surface is limited to being at least generally along a single reference axis when a first portion of said frame is disposed perpendicularly to the flat support surface, and wherein when said first portion of said frame is disposed perpendicularly to the flat support surface, each said transport member of said cutting edge cart that contacts the flat support surface does so at least generally along said single reference axis;
a carrier assembly movably interconnected with said first portion of said frame and comprising a cutting edge support assembly that is configured to support a cutting edge; and
an adjuster operative to selectively move said carrier assembly relative to said first portion of said frame to dispose a cutting edge being held by said cutting edge support assembly at a desired vertical position relative to the support surface.

39. The cart of claim 38, wherein said at least one transport member comprises first and second transport members, wherein said first and second transport members provide the sole contact between said cutting edge cart and the flat support surface when said first portion of said frame is disposed perpendicularly to the flat support surface.

40. The cart of claim 39, wherein said first and second transport members are rotatable about a single, common rotational axis.

41. The cart of claim 38, wherein said adjuster is mounted to said frame and interconnected to said carrier assembly to selectively move said carrier assembly relative to said first portion of said frame.

42. The cart of claim 38, further comprising:
a handle detachably interconnectable with said frame.

43. A cutting edge cart, comprising:
a frame;
at least one transport member that is interconnected with said frame and that allows said cutting edge cart to move along a support surface;
a carrier assembly movably interconnected with a first portion said frame and comprising a cutting edge support assembly that is configured to support a cutting edge, wherein each said transport member that contacts the support surface when said first portion of said frame is disposed perpendicularly to a flat support surface is mounted on a support and remains in contact with the flat support surface as said first portion of said frame is pivoted relative to the flat support surface through a first range of motion, wherein said first portion of said frame is pivoted relative to the support surface to position said carrier assembly for both loading a cutting edge on said cutting edge support assembly and unloading a cutting edge from said cutting edge support assembly, and wherein said first portion of said frame and said support are maintained in a fixed position relative to each other as said first portion of said frame is pivoted; and
an adjuster operative to selectively move said carrier assembly relative to said first portion of said frame to dispose a cutting edge being held by said cutting edge support assembly at a desired vertical position relative to the support surface.

44. The cart of claim 43, wherein said adjuster is mounted to said frame and interconnected to said carrier assembly to selectively move said carrier assembly relative to said first portion of said frame.

45. The cart of claim 44, wherein said adjuster comprises:
a crank mounted to said frame; and
at least one cable interconnecting said crank to said carrier assembly, said crank being operable to selectively wind said at least one cable and unwind said at least one cable, wherein said winding and unwinding moves said carrier assembly in first and second directions, respectively, relative to said first portion of said frame.

46. The cart of claim 45, wherein said adjuster further comprises at least one pulley mounted to at least one of said frame and said carrier assembly for routing said at least one cable between said carrier assembly and said crank.

47. The cart of claim 43, wherein each said transport member is disposed at least generally directly under the cutting edge when said first portion of said frame is disposed perpendicular to the support surface.

48. The cart of claim 43, further comprising:
a handle detachably interconnectable with said frame.

49. The cart of claim 43, wherein said at least one transport member comprises first and second transport members, wherein said first and second transport members provide the sole contact between said cutting edge cart and the flat support surface when said first portion of said frame is disposed perpendicularly to the flat support surface.

50. The cart of claim 49, wherein said first and second transport members are rotatable about a single, common rotational axis.

51. The cart of claim 42, wherein said support is part of said frame.

* * * * *